(12) United States Patent
Jabri et al.

(10) Patent No.: US 8,077,389 B2
(45) Date of Patent: Dec. 13, 2011

(54) GLASS POLARIZER FOR VISIBLE LIGHT

(75) Inventors: Khaled Jabri, Kanagawa (JP); Atsushi Arai, Tokyo (JP); Hiromichi Nishimura, Kanagawa (JP); Yoshihiko Noro, Kanagawa (JP); Dai Takeda, Tokyo (JP)

(73) Assignee: Okamoto Glass Co., Ltd., Chiba (JP)

( * ) Notice: Subject to any disclaimer, the term of this patent is extended or adjusted under 35 U.S.C. 154(b) by 426 days.

(21) Appl. No.: 12/226,815

(22) PCT Filed: Dec. 6, 2007

(86) PCT No.: PCT/JP2007/001366
§ 371 (c)(1), (2), (4) Date: Oct. 29, 2008

(87) PCT Pub. No.: WO2008/072368
PCT Pub. Date: Jun. 19, 2008

(65) Prior Publication Data
US 2009/0168172 A1    Jul. 2, 2009

(30) Foreign Application Priority Data

Dec. 15, 2006 (JP) ................................. 2006-337871

(51) Int. Cl.
- *G02B 5/30* (2006.01)
- *G02B 27/28* (2006.01)
- *F21V 9/14* (2006.01)
- *G02C 7/12* (2006.01)

(52) U.S. Cl. ................ 359/487.02; 359/487.06; 252/585

(58) Field of Classification Search .................. 359/483, 359/485, 489–492, 483.01, 486.01, 487.01, 359/487.02, 487.06; 252/584–585; 264/1.31–1.35
See application file for complete search history.

(56) References Cited

U.S. PATENT DOCUMENTS

| | | | | |
|---|---|---|---|---|
| 4,125,405 A | * | 11/1978 | Araujo et al. | 501/13 |
| 4,479,819 A | * | 10/1984 | Borelli et al. | 65/30.11 |
| 5,281,562 A | * | 1/1994 | Araujo et al. | 501/32 |
| 5,517,356 A | * | 5/1996 | Araujo et al. | 359/490 |
| 6,221,480 B1 | * | 4/2001 | Borrelli et al. | 428/325 |
| 6,298,691 B1 | * | 10/2001 | Borrelli et al. | 65/30.1 |

(Continued)

FOREIGN PATENT DOCUMENTS

| | | |
|---|---|---|
| GB | 2 075 002 A | 11/1981 |
| JP | 56-169140 | 12/1981 |
| JP | 2740601 | 1/1998 |

(Continued)

*Primary Examiner* — Stephone Allen
*Assistant Examiner* — Kimberly N Kakalec
(74) *Attorney, Agent, or Firm* — Clark & Brody

(57) ABSTRACT

A glass polarizer applicable to projection-type liquid crystal displays and the like and having an excellent transmittance and extinction ratio with respect to light in the visible light region (500 nm to 600 nm) using silver halide containing glass as a starting material is provided.

A glass polarizer for visible light according to the present invention is a polarizer manufactured by heating and stretching borosilicate glass in which silver halide particles are dispersed and deposited by heat treatment and reducing at least a portion of silver halide particles oriented and stretched in the glass to produce metallic silver particles. An average transmittance (T⊥ % 500 to 600 nm) in a wavelength range of 500 nm to 600 nm of light having a polarization plane perpendicular to a longitudinal direction of metallic silver particles having shape anisotropy that is uniaxially oriented and dispersed is 75% or more and an extinction ratio in the wavelength range is 25 dB or more.

4 Claims, 12 Drawing Sheets

U.S. PATENT DOCUMENTS

| | | | | |
|---|---|---|---|---|
| 6,313,947 | B1 * | 11/2001 | Takahashi et al. | 359/485.03 |
| 6,606,885 | B2 * | 8/2003 | Harris et al. | 65/30.11 |
| 7,618,908 | B2 * | 11/2009 | Borrelli et al. | 501/19 |
| 2003/0064875 | A1 * | 4/2003 | Yamashita et al. | 501/32 |
| 2006/0107696 | A1 * | 5/2006 | Aoki | 65/30.1 |
| 2007/0093373 | A1 * | 4/2007 | Borrelli et al. | 501/2 |

FOREIGN PATENT DOCUMENTS

| | | |
|---|---|---|
| JP | 2003-139951 | 5/2003 |
| JP | 2003-279749 | 10/2003 |
| JP | 2004-086100 | 3/2004 |
| JP | 2005-504711 | 2/2005 |

* cited by examiner

GLASS POLARIZER FOR VISIBLE LIGHT

TECHNICAL FIELD

The present invention relates to a glass polarizer having polarization characteristics industrially usable for light in a visible light region. In particular, the present invention relates to a glass polarizer for visible light having excellent heat resistance and light resistance usable as a polarizer for a projection-type liquid crystal display.

BACKGROUND ART

In recent years, projection-type liquid crystal displays are widely used as display units for displaying on a big screen. Rear projection-type liquid crystal displays are mainly used for big-screen TVs and front projection-type liquid crystal displays for presentation of personal computer data. A projection-type liquid crystal display has a structure to enlarge and project an image on small liquid crystal elements onto a big screen by using an optical system of projection. A detailed technical description can be found, for embodiment, in Non-Patent Document 1 (big-screen display).

FIG. 1 shows a configuration of a typical projection-type liquid crystal display. Light from a light source 4 is separated into blue (B), green (G), and red (R) components by optical components 5 to 16 and is the light components are guided to corresponding liquid crystal elements 2B, 2G, and 2R, respectively. The liquid crystal elements 2R, 2G, and 2B have incident-side polarizers 1R, 1G, and 1B on the incident side and exit-side polarizers 3R, 3G, and 3B on the exit side respectively. A set of polarizers each having an incident-side polarizer and an exit-side polarizer corresponding to red, green, or blue has a function to selectively allow light passed through the liquid crystal element in a predetermined polarization direction to pass. This function allows lights in three primary colors passed through the liquid crystal elements 2B, 2G, and 2R to become a light intensity modulated image signal. These lights in three primary colors are further synthesized optically by a synthesis prism 17 and further projected onto a screen 19 through a magnifying projector lens system 18.

Polarization characteristics required for polarizing elements include a property that transmits optical signals having a desired polarization plane, while at the same time blocking unnecessary optical signals having a polarization plane perpendicular thereto. That is, a desired property is to have a large transmittance with respect to light having a desired polarization plane and a small transmittance with respect to light having a polarization plane perpendicular thereto.

The ratio of these transmittances is called an extinction ratio and is widely used by those skilled in the art as a performance index representing performance of a polarizing element. Using this index, performance required for polarizing elements applied to a projection-type liquid crystal display can be expressed as having a large transmittance and a large extinction ratio with respect to an optical signal. An industrially usable polarizer is said to preferably have the transmittance of 70% or more with respect to light of the wavelength to be used and the extinction ratio of 10:1, preferably 3000:1 (Patent Document 1).

A social demand for a projection-type liquid crystal display is a demand to realize bigger and clearer images by a smaller device. To realize this demand, a recent technical trend is to apply a light source of a larger quantity of light and to use smaller liquid crystal elements. As a result, light of higher energy density is introduced not only to liquid crystal elements, but also to polarizers placed before and after the liquid crystal elements. Particularly high heat resistance and light resistance are increasingly demanded for polarizers having a function to absorb unnecessary light.

According to principles of polarizers, dichromatic polarizers that selectively absorb light depending on the polarization plane and non-dichromatic polarizers (such as a Brewster polarizer) are known (See Patent Document 2). Dichromatic polarizers have thin elements and do not need any special device to absorb unnecessary light and thus are desired elements for projection-type liquid crystal displays whose miniaturization is particularly demanded.

Currently, dichromatic polarizers realizing practical optical performance in the visible light region are only polarizing films made of organic material. However, polarizers made of organic resin have a fatal defect of low heat resistance (See Patent Document 1).

To rectify the defect, polarizing films made of organic resin are used by sticking polarizing films to a sapphire substrate having a high thermal conductivity (Patent Document 3). However, polarizers stuck to sapphire having an excellent thermal conductivity cannot satisfy technical requirements of higher intensity in recent years, that is, requirements that no degradation of polarizer functions caused by light absorption/heat generation by polarizing elements in a green region with the highest intensity occur. Accordingly, a cooling device including a cooling fan is installed in a projection-type liquid crystal display to protect organic resin films from heat. The cooling device not only is against social needs of miniaturization, but also creates another problem of noise.

As a method to solve this technical problem, an idea of applying polarizing glass applied to elements for optical communication has been proposed (Patent Document 1). However, the wavelength of light used for optical communication is in a far-infrared region and is vastly different from that of visible light and thus, technology of glass polarizers for optical communication cannot be immediately applied to projection-type liquid crystal displays controlling visible light. The invention disclosed in Patent Document 1 does not disclose any technology to provide effective characteristics to glass polarizing elements with respect to light in the visible light region and therefore, it is difficult to realize a projection-type liquid crystal display using glass polarizers by using only this invention.

Here, the technical background of polarizing glass will be briefly described. The polarizing glass is glass characterized in that metallic fine particles having shape anisotropy oriented and dispersed in an optically transparent glass substrate are contained and realizes polarization characteristics by an anisotropic resonance absorption phenomenon of surface plasmons present on the surface of metallic fine particles (See Patent Document 4 and Non-Patent Document 2).

Surface plasmon resonance absorption characteristics of metallic fine particles in Patent Document 4 are cited as FIG. 2. A graph A in FIG. 2 corresponds to surface plasmon resonance absorption by spherical metallic fine particles. Resonance absorption of metallic fine particles having cylindrically stretched shape anisotropy shows different characteristics due to correlations between the polarization plane of incident light and metallic fine particles having shape anisotropy.

When the polarization plane is in parallel with the longitudinal direction of metallic fine particles, characteristics indicated by B are exhibited. It is seen that the wavelength of resonance absorption is shifted to a longer wavelength as compared with the characteristics A. It is known that this resonance absorption wavelength depends on the ratio of a longer diameter to a shorter diameter of metallic fine particles and the resonance absorption wavelength becomes larger as the ratio increases (See Non-Patent Document 2). With respect to light having the polarization plane perpendicular to the longitudinal direction, on the other hand, properties shown by characteristics C are exhibited.

FIG. 2 shows that the glass has polarization characteristics with respect to light near 600 nm. That is, the glass has a small transmittance with respect to light having the polarization plane in parallel with the longitudinal direction of metallic particles due to strong absorption. The transmittance with respect to light having the polarization plane in parallel with the longitudinal direction of metallic particles will be represented as T∥ % below. On the other hand, the glass shows poor absorption of light having the polarization plane perpendicular to the longitudinal direction of metallic particles and therefore, a larger transmittance. The transmittance with respect to light having the polarization plane perpendicular to the longitudinal direction of metallic particles will be represented as T⊥ % below. Polarization characteristics are realized by the mechanism described above. Incidentally, characteristics disclosed in FIG. 2 do not realize characteristics required for projection-type liquid crystal displays, that is, the characteristics that the ratio of the parallel absorption curve B to the perpendicular absorption curve C between 500 nm and 600 nm, namely, the extinction ratio is sufficiently large and the value of parallel absorbance is sufficiently large.

Many technologies have been proposed for polarizing glass and glass polarizers using polarizing glass. Many of these technologies relate to glass polarizers applicable to light in the infrared region (such as Patent Document 5 and Patent Document 6) and no technology applicable to light in the visible light region used in a projection-type liquid crystal display, which is an object of the present invention, is disclosed.

Only a small number of inventions relate to glass polarizers applicable to light in the visible light region. Patent Document 7 discloses a technology to provide polarizing elements effective for light in the visible light region by using characteristics of copper fine particles having shape anisotropy (Disclosed characteristics are cited in FIG. 3). However, as seen in FIG. 3, a large extinction ratio particularly for wavelengths equal to 600 nm or less cannot be realized, that is, the ratios (extinction ratios) of values of parallel transmittance curves D and F to those of transmittance curves C and E perpendicular to the stretch axis are small and also the value of the transmittance C is only 10 to 60%, leading to a conclusion that the polarizing elements do not have practical characteristics.

Patent Document 8 discloses a technology to realize dichromatic absorption with respect to wavelengths in the visible light region. However, characteristics applicable to a projection-type liquid crystal display, which is an object of the present invention, that is, a high transmittance and a high extinction ratio are not specifically and quantitatively described and thus, the technology cannot be considered to be able to realize polarizers. Like Patent Document 8, Patent Document 9 proposes a technology to obtain an effective extinction ratio in the visible light region, but no technology to realize a high transmittance is disclosed.

CODIXX AG offers polarizing glass effective in the visible light region by using a manufacturing technique providing shape anisotropy to silver fine particles by introducing silver ions by diffusion from the glass surface, causing silver fine particles to deposit by heat treatment and stretching the glass (Non-Patent Document 3). However, since the ion diffusion process is generally unstable and concentrations of silver ions are distributed in the thickness direction of the glass, dimensions of generated silver particles tend to be non-uniform. As a result, the ion diffusion process has a weak point of producing fluctuations in characteristics of polarizers. Further, there is a problem that the glass is more likely to break when being stretched because particles to be stretched are solid metallic silver particles for which more stretching tension is needed than silver halide particles stretched in a liquid drop state.

A different manufacturing method is used for infrared glass polarizers for communication industrially widely used. That is, as described in Patent Document 4 and Patent Document 5, a manufacturing method by which silver fine particles are produced by temporarily causing silver halide to deposit and then reducing silver halide is adopted. However, polarizers manufactured by this manufacturing method do not exhibit practical performance that can be used in visible light region (Patent Document 5). For embodiment, FIG. 1 (cited herein as FIG. 4) and paragraph [0022] of the specification of Patent Document 5 describes that "it is difficult to satisfactorily manufacture effective optical polarizers extending over an entire region of 400 nm to 700 nm from silver halide glass."

As described above, a glass polarizer that is based on a stable manufacturing technology industrially widely applicable, is applicable to projection-type liquid crystal displays, and supports visible light does not exist.

Patent Document 1: Japanese Patent Application Laid-Open No.
Patent Document 2: Japanese Patent Application Laid-Open No.
Patent Document 3: Japanese Patent Application Laid-Open No.
Patent Document 4: U.S. Pat. No. 4,479,819
Patent Document 5: Japanese Patent No. 1618477
Patent Document 6: Japanese Patent No. 2740601
Patent Document 7: Japanese Patent No. 2885655
Patent Document 8: Japanese Patent Application Laid-Open No.
Patent Document 9: Japanese Examined Application Publication No. 2-40619
Patent Document 10: Japanese Patent No. 2628014
Patent Document 11: Japanese Patent No. 3549198
Non-Patent Document 1: N. Nishida, "Big-Screen Display (Series, Advanced Display Technology 7)", Kyoritsu Shuppan, Tokyo, 2002
Non-Patent Document 2: S. Link and M. A. El-Sayed, J. Phys. Chem. B103 (1999), pp. 8410-8426
Non-Patent Document 3: K. Suzuki, Kogyo Zairyo Vol. 52, No. 12, pp. 102-107

DISCLOSURE OF THE INVENTION

Problem to Be Solved by the Invention

An object of the present invention is to provide a technology to realize a glass polarizer applicable to projection-type liquid crystal displays and the like and having an excellent transmittance and extinction ratio with respect to light in the visible light region (500 nm to 600 nm) using silver halide containing glass as a starting material.

Means for Solving the Problem

Glass polarizing elements in the present invention use surface plasmon resonance of metallic fine particles having shape anisotropy oriented and dispersed in the glass. Though the same principle is used, the conventional technology shown in FIG. 4 does not realize performance required for polarizers applicable to projection-type liquid crystal displays. The cause thereof will be described using FIG. 2.

The curve C in FIG. 2 shows that surface plasmon resonance absorption with respect to light having a polarization plane perpendicular to the longitudinal direction of metallic fine particles having shape anisotropy is present near 380 nm. At the same time, the curve C in FIG. 2 also shows that an influence thereof extends in the range from 500 nm to 600 nm. This influence produces an effect of transmitting light having a polarization plane to be transmitted with a higher transmittance. At the same time, the curve B shows absorption with respect to light having a polarization plane in parallel with the longitudinal direction and thus, FIG. 2 shows that a large difference in absorbance, that is, transmittance arises due to a difference of the polarization plane near 600 nm.

For polarizers applied to light beam in the infrared region, light to be transmitted has a wavelength far away from the wavelength of the resonance absorption and the above influence is at a negligible level, causing practically no problem. In contrast, when realizing polarizing elements for visible light, the above influence is at a level that cannot be ignored. Therefore, to realize a glass polarizer applied to visible light in the green region, a new technical means for minimizing light absorption in the wavelength range of 500 nm to 600 nm is needed. As a simple technical means, the transmittance with respect to passing light can be improved by reducing concentrations of metallic particles to inhibit the absorption, but if the technical means is adopted, it becomes difficult to inhibit light having a polarization plane to be inhibited. As a result, a necessary extinction ratio cannot be realized.

As a result of studying the problem, the inventors found that the transmittance near 500 nm can be improved by making dimensions of silver particles smaller. That is, by using silver particles prepared from silver halide having the particle size of 40 nm or less, the inventors found that the transmittance $T\perp$ % with respect to light having the polarization plane perpendicular to the longitudinal direction of metallic fine particles can be made larger.

Further, the use of silver halide having a smaller particle size produced another effect of controlling the transmittance $T\|$ % of light to be blocked by the polarizer, that is, light having the polarization plane in parallel with the longitudinal direction of metallic fine particles having shape anisotropy to a small value up to about 500 nm. As a result, by using silver halide having a small particle size, it becomes possible not only to make the transmittance $T\perp$ % of light to be transmitted larger near 500 nm, but also to keep the extinction ratio large.

The present invention is based on conventional technology considering that glass material in which silver halide is deposited and dispersed is used as a starting material, but some technologies need to be added to realize functions to be effective for light in the visible light region.

In a conventional technology of polarizing glass using silver halide for optical communication using a near-infrared region of 1.3 to 1.5 μm, polarizing glass has been manufactured by stretching particles made of mixed crystal of silver chloride and silver bromide and whose particle size is 50 nm or more. Thus, no technology regarding polarizing glass for the visible light region according to the present invention is disclosed at all.

By making a minute investigation of not only the grain size of silver particles but also the composition of deposited silver halide particles, the present invention found that the transmittance $T\perp$ % of light to be transmitted near 500 nm of light to be passed and the extinction ratio thereof can be made larger when particles of only silver chloride containing no bromine are used.

A mercury lamp is used in a projection-type liquid crystal display as a light source and a visible light source contains in most cases components of ultraviolet light. Glass in which silver halide fine particles are deposited, which is widely known under the name of photochromic glass, has properties that when the glass is irradiated with ultraviolet light, an absorption band extending from the visible light region to the near-infrared region is produced to color the glass and when the ultraviolet light is blocked, the state before irradiation is restored.

In transmission spectra ($T\|$ spectra) of light having a polarization plane in parallel with the longitudinal direction of metallic fine particles having shape anisotropy in FIG. 2, light in the wavelength range of 500 to 700 nm absorbs well and a transmission peak due to a reversal mode of surface plasmon resonance absorption is observed in the wavelength range of 300 to 400 nm. Since light in this band exactly corresponds to the sensitive wavelength of silver halide, silver halide remaining inside the polarizing glass without being reduced is exposed to light, lowering the transmittance in the visible light region. Therefore, it is preferable to select material for polarizing glass for the visible light region in the present invention in which photochromism does not appear.

Conventional technologies regarding polarizing glass exhibiting no photochromism include a technology in which CuO is hardly contained in the glass or the base glass composition is limited (($R_2O-Al_2O_3$): $B_2O_3$<0.25 in molar ratio) (Patent Document 9), a technology in which substantially no CuO is contained in the glass and an amount of $CeO_2$ effective in maintaining silver in the glass in an oxidation state is added (Patent Document 10), and a technology to prevent reduction of silver to metal silver by limiting the composition in which basicity of glass is increased by containing substantially no CuO, containing a large amount of $K_2O$, and adding BaO (Patent Document 11).

In the present invention, after nitrate was added for 0.5 to 5 wt % of alkali oxides as glass material in glass melting, silver was dissolved as ions in the glass so that non-photochromic glass could be obtained. That is, non-photochromic glass was obtained without adding CuO or $CeO_2$ used in the conventional technologies as an oxidizing agent and limiting the composition of the base glass.

Effect of the Invention

According to the present invention, as described above, glass polarizers whose transmittance in the wavelength range of 500 to 600 nm is 75% or more and whose extinction ratio is 25 dB or more can be provided. A projection-type liquid crystal display to which glass polarizers having the above performance and which is excellent in heat resistance and light resistance (particularly ultraviolet light resistance) are applied enables the use of a light source of more energy and thus, as a result, a smaller and clearer display can be realized. Further, while performance of conventional resin polarizing films degrades due to heat, light and the like, image quality of the projection-type liquid crystal display can be maintained at a high level by using polarizing glass excellent in heat resistance and light resistance.

BEST MODE FOR CARRYING OUT THE INVENTION

Figure 1:
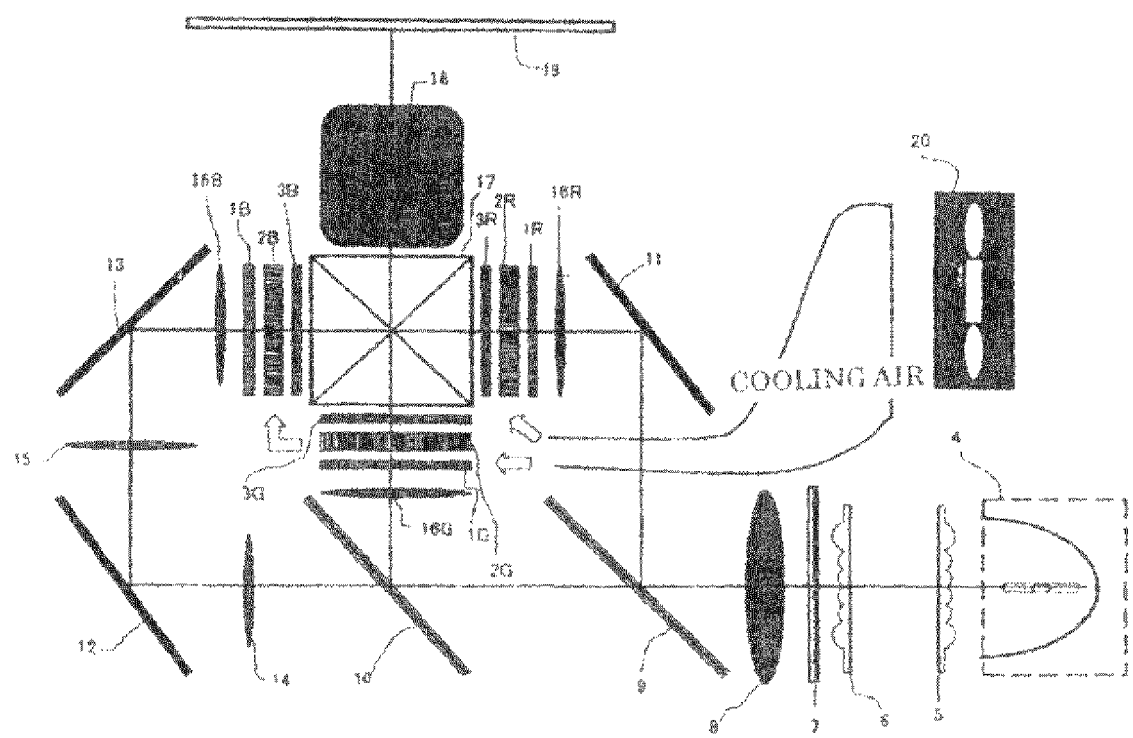
FIG. 1 is a conceptual diagram of an optical engine of a liquid crystal projector (Patent Document 1).
Figure 2:
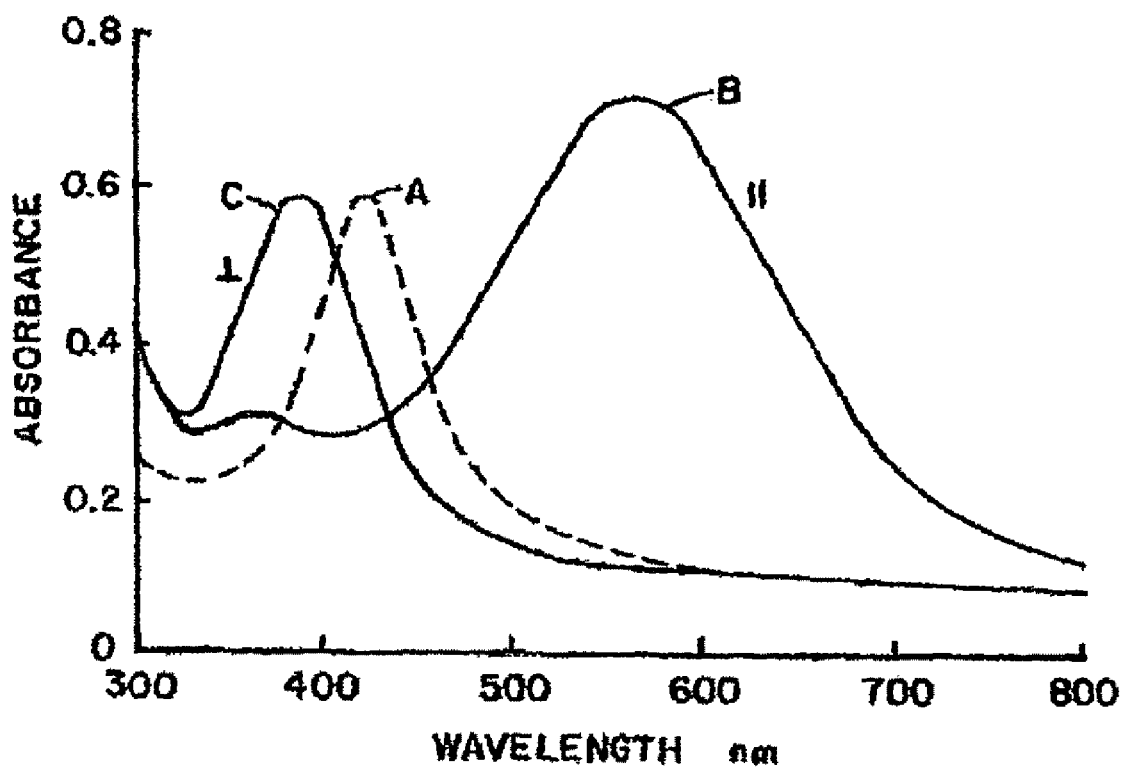
FIG. 2 is a graph showing absorption spectra of stretch-oriented silver particles and non-oriented silver particles (Patent Document 4).
Figure 3:
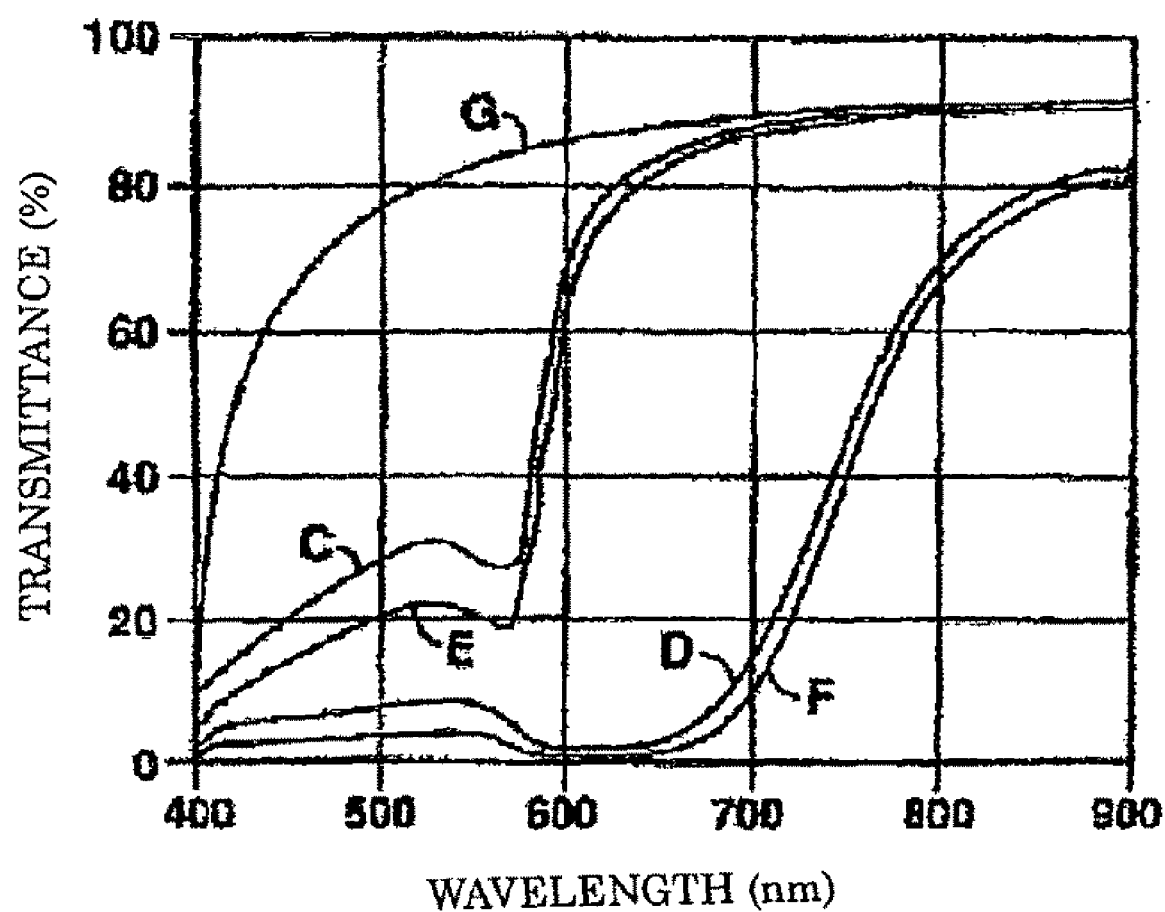
FIG. 3 is a graph showing transmittance curves of light whose visible light is polarized by stretching of silver particles (Patent Document 7).
Figure 4:
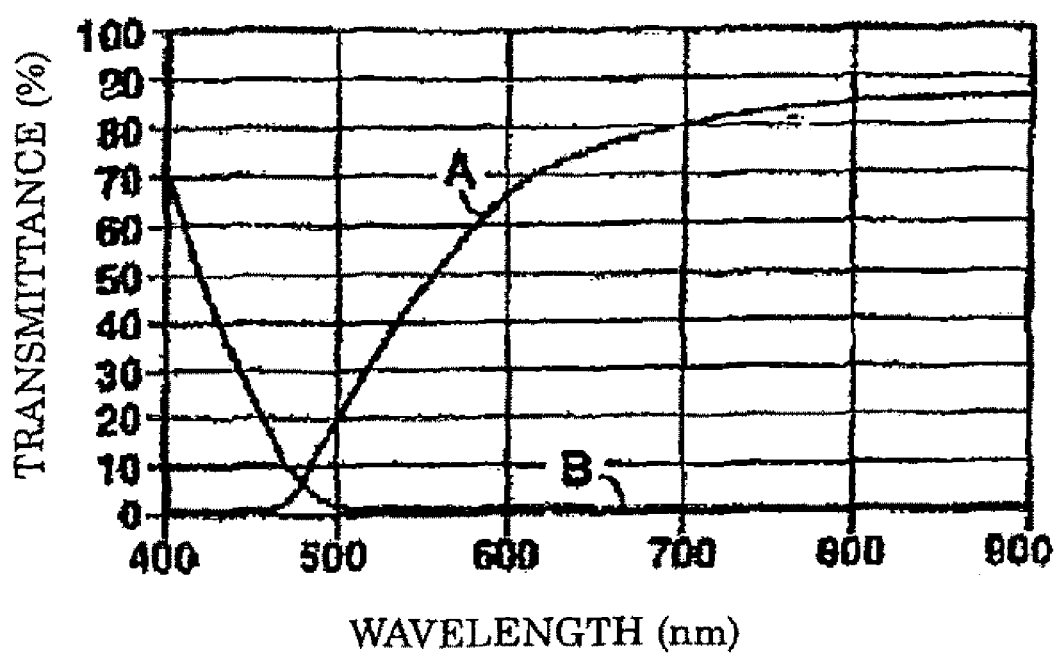
FIG. 4 is a graph showing transmittance curves of light whose visible light is polarized by stretching of silver particles (Patent Document 7).

An embodiment of the present invention will be described below. A manufacturing technology for carrying out the present invention will be realized by adding a technology to make deposited particles of silver halide finer and a technology to prevent realization of photochromism to a known technology to manufacture polarizing glass for infrared light.

First, a batch of glass of predetermined composition is prepared. At this point, the following conditions should be noted in selecting the composition and material. It is necessary to select glass that does not have so-called photochromic characteristics in which the transmittance degrades due to light irradiation as glass applied to polarizers used in the visible light region. For this purpose, it is necessary, for embodiment, to strictly avoid impurity mixing of copper oxide in the glass material. Also, the composition of introduction amount of silver halide is selected so that both the transmittance and extinction ratio are consistent in the end.

A batch of glass of the predetermined composition is melted and poured into a mold to produce plate-shaped glass. Next, metal halide particles are caused to deposit in the base glass by heat treatment. The particle size generally decreases as the heat treatment temperature is lower and the heat treatment time is shorter. Heat treatment conditions are optimized depending on the type and composition of the glass.

Base glass in which metal halide particles whose average particle size is 40 nm or less are dispersed undergoes a predetermined process to be made into a plate-shaped perform and transferred to a stretch process.

In the stretch process, the preform is stretched by adjusting the viscosity (more directly, the heating temperature) and stretching tension (force to stretch the glass=load on the glass) of the glass so that metallic particles after reduction have an appropriate aspect ratio.

The stretched glass undergoes a reduction process to have a portion or all of stretched silver halide particles as silver particles. The time duration, temperature, and atmosphere of the reduction process determine the depth of a layer of reduced metallic particles present near the surface and thus need to be determined carefully so that final characteristics are realized. Subsequently, an anti-reflection film is formed before a polarizing element according to the present invention is completed.

EMBODIMENTS

The present invention will further be specifically described using embodiments and References. Table 1 shows embodiments and References. However, the technical scope of the present invention is not limited to the embodiments shown below.

TABLE 1

|  | #1 | #2 | #3 | #4 | #5 | #6 | R.#1 | R.#2 |
|---|---|---|---|---|---|---|---|---|
| Heat treatment temperature (° C.) | 590 | 600 | 610 | 615 | 620 | 630 | 640 | 650 |
| Heat treatment time (Hr) | 4 | 5 | 5 | 5 | 5 | 5 | 5 | 5 |
| Average particle size of silver chloride (nm) | 18 | 23 | 25 | 28 | 32 | 37 | 45 | 55 |
| Glass viscosity when stretched (poise) | $10^{10.8}$ | $10^{10.8}$ | $10^{10.5}$ | $10^{10.5}$ | $10^{10.3}$ | $10^{10.1}$ | $10^{9.9}$ | $10^{9.9}$ |
| Glass preform feed speed (mm/min) | 5 | 5 | 5 | 5 | 5 | 5 | 5 | 5 |
| Glass tension speed (mm/min) | 160 | 160 | 120 | 120 | 120 | 100 | 80 | 80 |
| Stretching tension (kgf/cm$^2$) | 650 | 600 | 550 | 530 | 510 | 500 | 450 | 400 |
| Hydrogen reduction temperature (° C.) | 445 | 445 | 440 | 435 | 430 | 425 | 420 | 420 |
| Hydrogen reduction time (Hr) | 6 | 6 | 6 | 6 | 6 | 6 | 6 | 6 |
| Average transmittance (T⊥%$_{500-600\,nm}$) | 82 | 79 | 78 | 77 | 76 | 75 | 63 | 51 |
| Minimum extinction ratio (dB$_{500-600\,nm}$) | 27 | 25.5 | 29 | 26 | 26 | 25 | 8.7 | 8.4 |

First, a batch of material was prepared by mixing $SiO_2$, $H_3BO_3$, $Al(OH)_3$, $Li_2CO_3$, $NaNO_3$, $(Na_2CO_3)$, $K_2CO_3$, NaCl, and AgCl as materials so that $SiO_2$: 58.01%, $B_2O_3$: 18.3%, $Al_2O_3$: 9.5%, $Li_2O$: 1.9%, $Na_2O$: 2.0%, $K_2O$: 9.6%, Ag: 0.32%, and Cl: 0.37% by weight. At this time, 2% by weight of $Na_2O$ was mixed using $NaNO_3$ (sodium nitrate), which is a nitrate material. The batch of material was melted at 1430° C. for four hours in a platinum crucible of 300 cc capacity and then poured into a mold and pressed by a roller to obtain plate-shaped glass of approximately 250×60×2.5 mm in thickness.

The plate-shaped glass was heat-treated to have silver chloride particles deposited. The particle size of silver chloride particles was controlled by the heat treatment temperature and heat treatment time as shown in Table 1. Results of measuring average particle size of silver chloride particles by an electronic microscope are also shown in Table 1.

The obtained glass preform was set vertically in a drafting oven and was heated and stretched while the preform being moved downward at a constant rate by balancing the feed speed and receipt speed. The viscosity and stretching tension (load on the glass per unit area) of the glass in the stretching process are shown in Table 1. The stretching tension was mainly controlled by the glass heating temperature (Such speed settings are also shown in Table 1).

The stretched glass tape was cut to a length of about 50 mm and both faces thereof were polished. Then, the cut glass tapes were heat-treated under reduction conditions (temperature, time) shown in Table 1 while a hydrogen gas being caused to flow at a rate of about 1.5 liter/min in a reducing furnace.

Next is a film formation process. After being washed and dried, a plurality of samples was set in a vapor deposition chamber and an anti-reflection effect was provided by forming an alternate 4-layer film (anti-reflection film) of $SiO_2$ and $Ta_2O_5$ on both sides of the samples by the sputtering method or vacuum evaporation method.

Figure 5:
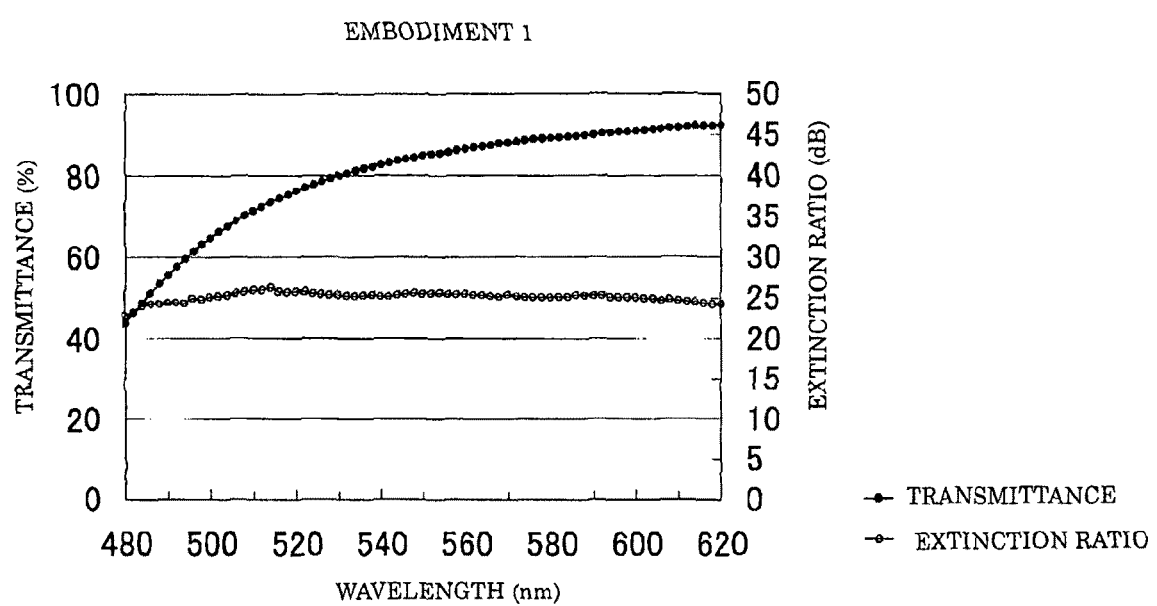
FIG. 5 is a graph showing light transmittance and extinction ratio curves in the wavelength range of 480 to 620 nm of Embodiment 1.
Figure 6:
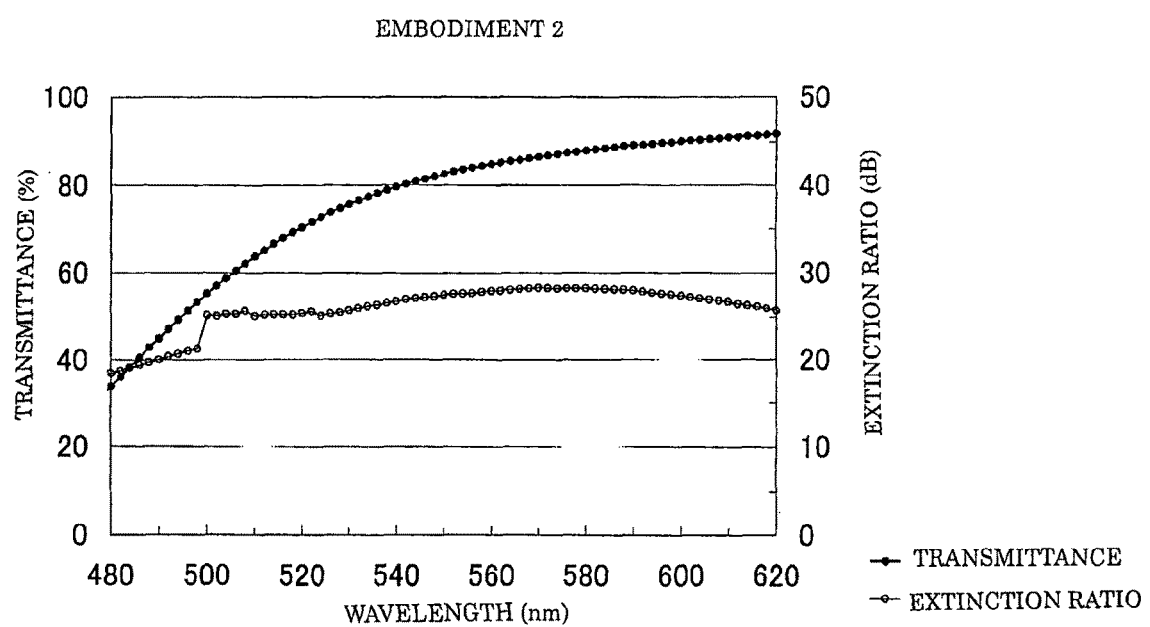
FIG. 6 is a graph showing light transmittance and extinction ratio curves in the wavelength range of 480 to 620 nm of Embodiment 2.
Figure 7:
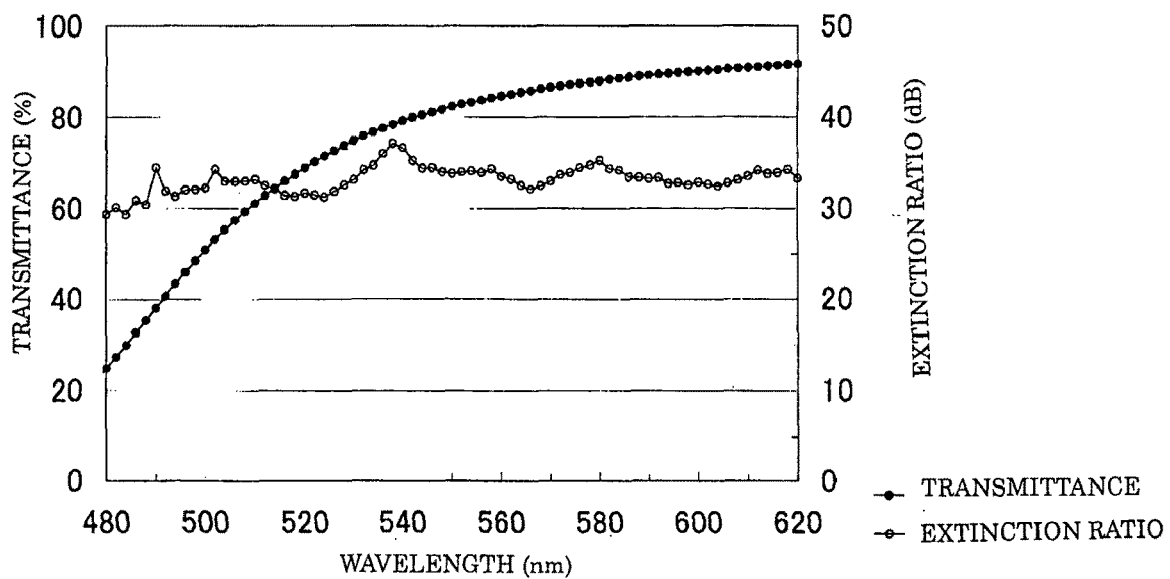
FIG. 7 is a graph showing light transmittance and extinction ratio curves in the wavelength range of 480 to 620 nm of Embodiment 3.
Figure 8:
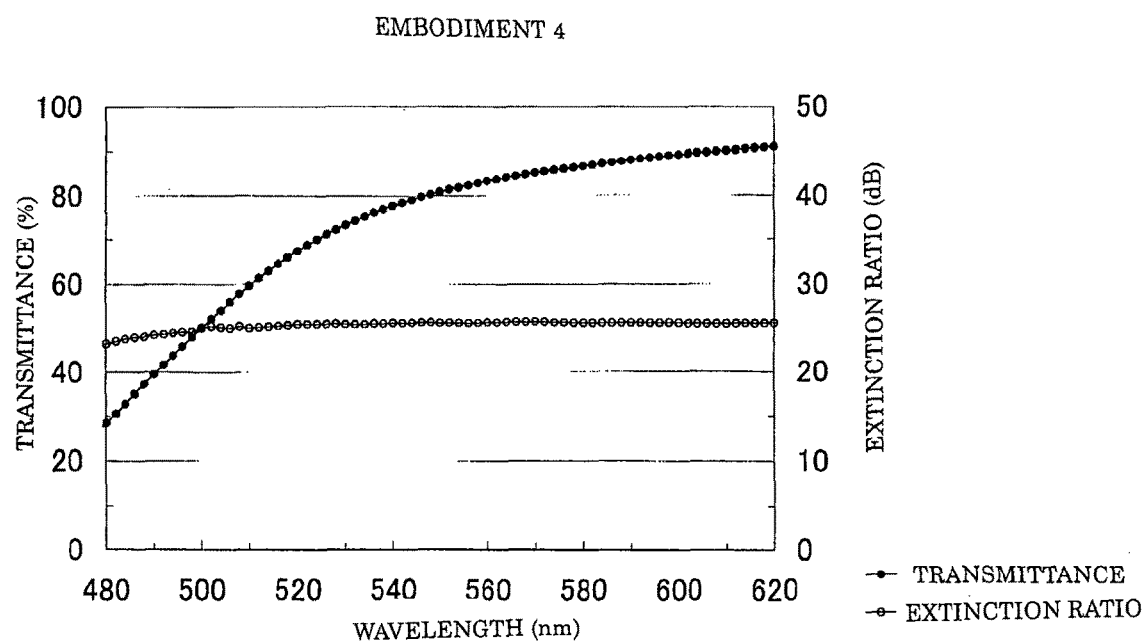
FIG. 8 is a graph showing light transmittance and extinction ratio curves in the wavelength range of 480 to 620 nm of Embodiment 4.
Figure 9:
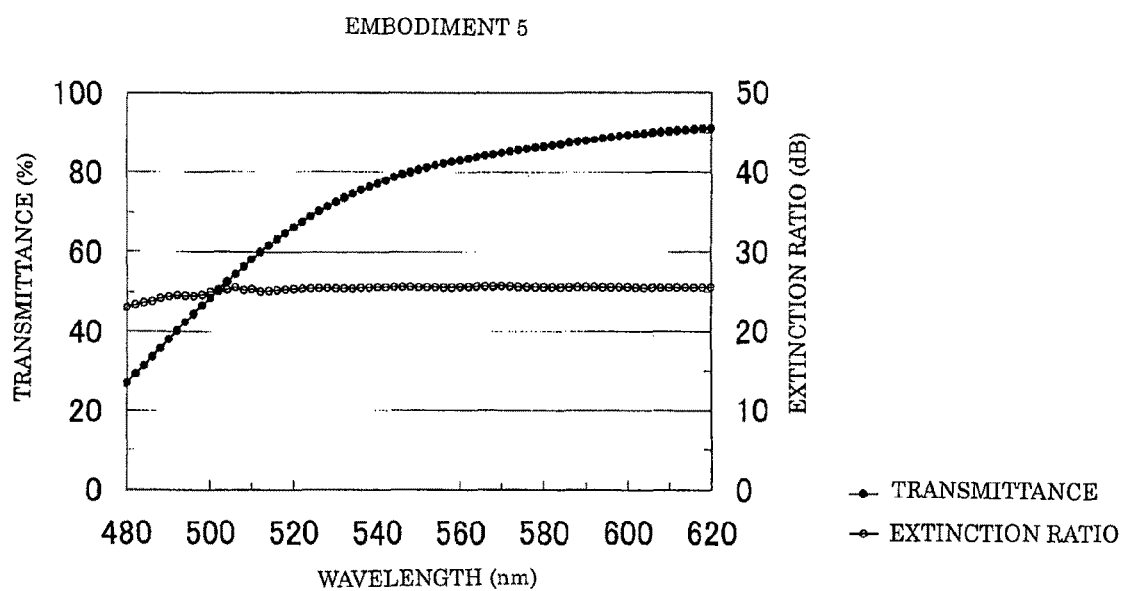
FIG. 9 is a graph showing light transmittance and extinction ratio curves in the wavelength range of 480 to 620 nm of Embodiment 5.
Figure 10:
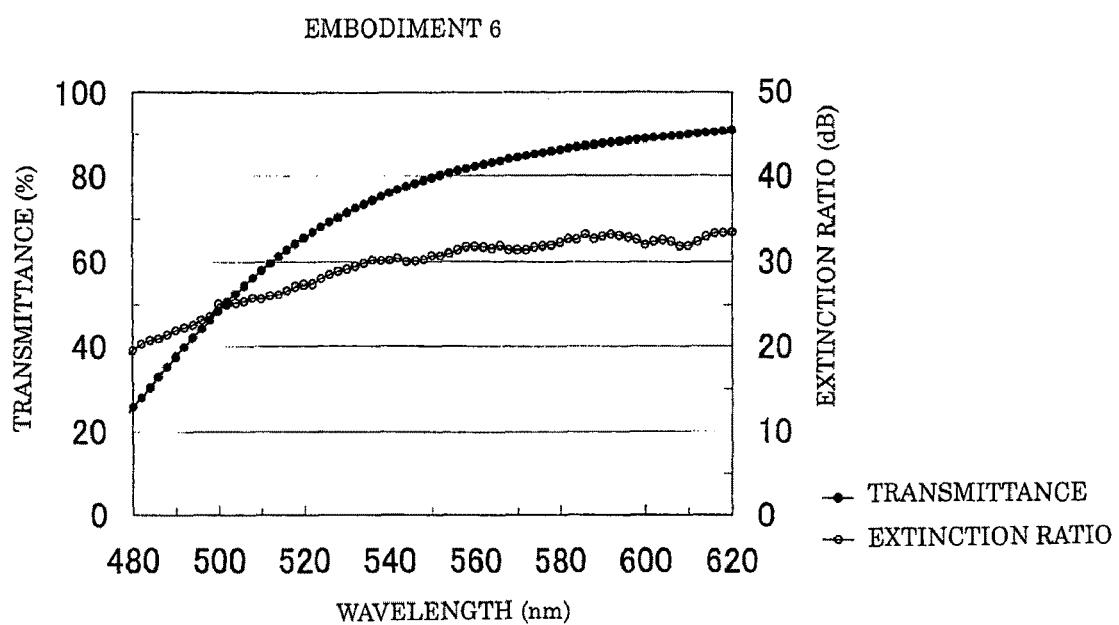
FIG. 10 is a graph showing light transmittance and extinction ratio curves in the wavelength range of 480 to 620 nm of Embodiment 6.
Figure 11:
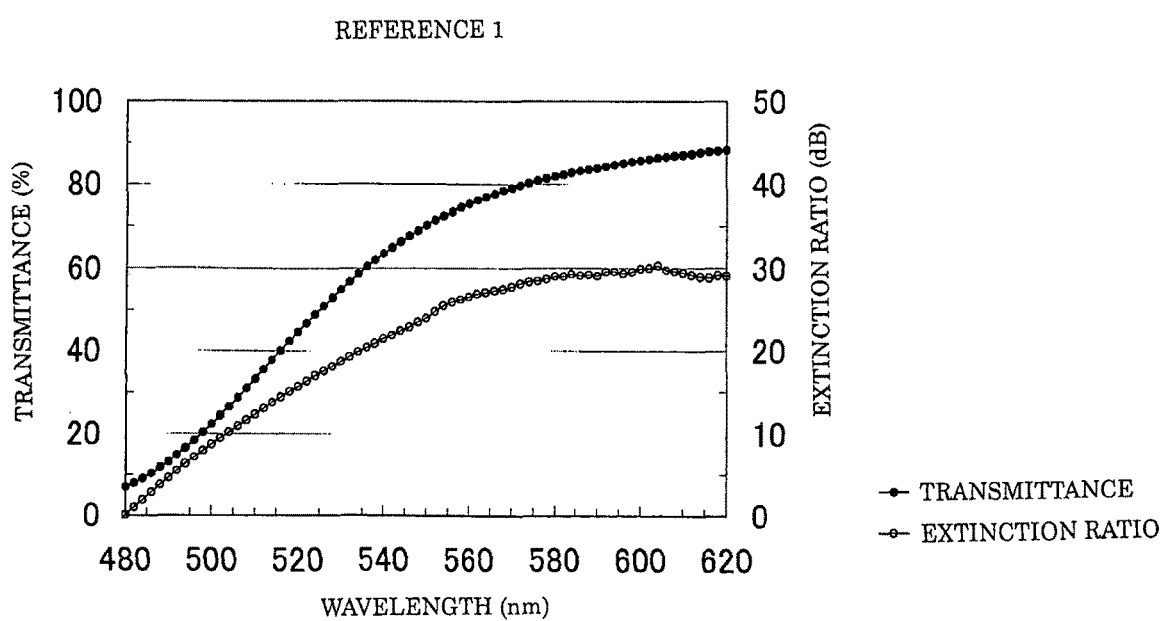
FIG. 11 is a graph showing light transmittance and extinction ratio curves in the wavelength range of 480 to 620 nm of Reference 1.
Figure 12:
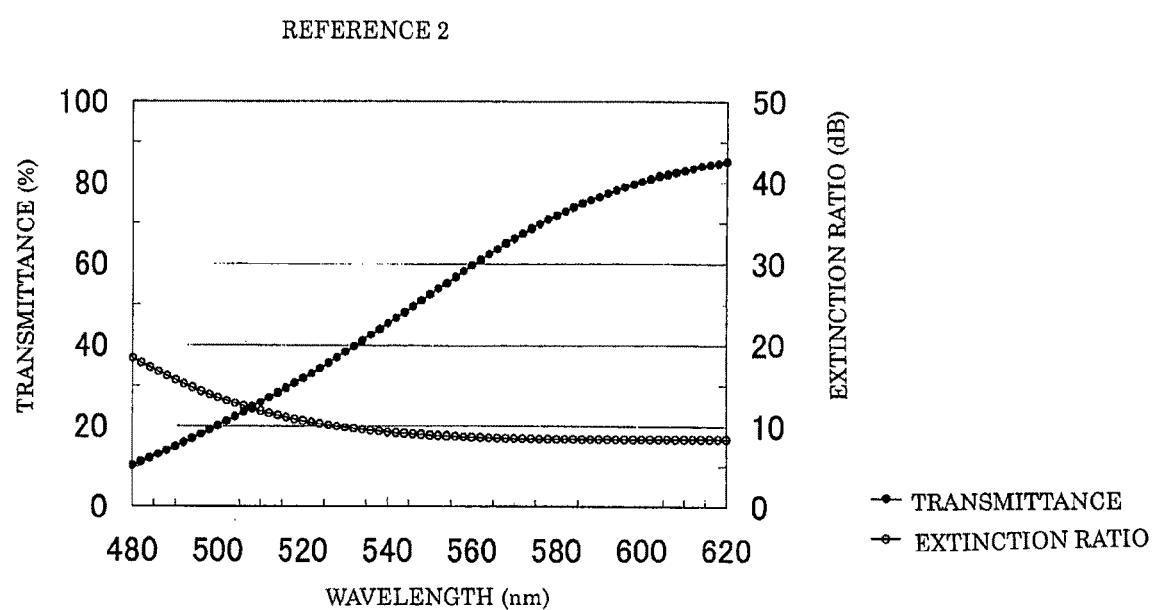
FIG. 12 is a graph showing light transmittance and extinction ratio curves in the wavelength range of 480 to 620 nm of Reference 2.

Polarization characteristics of the polarizing glass produced in this manner are also shown in Table 1. Also, data of transmittance spectra (T⊥ %) of light having a polarization plane perpendicular to the longitudinal direction of metallic silver particles of the wavelength range of 500 nm to 600 nm (a range of 480 nm to 620 nm in actual graphs) in Embodiments 1 to 6 and References 1 and 2 and data of extinction ratio in this wavelength range are shown in FIGS. 5 to 10 and FIGS. 11 and 12.

The extinction ratio was calculated from the average transmittance T⊥ % of light having a polarization plane perpendicular to the longitudinal direction of metallic silver particles in the wavelength range of 500 nm to 600 nm in transmission spectra measured by using a spectrophotometer and the average transmittance T∥ % of light having a polarization plane in parallel to the longitudinal direction of the metallic silver particles using a formula shown below. The minimum extinction ratio in the wavelength range of 500 nm to 600 nm is shown in Table 1.

$$\text{Extinction ratio (dB)} = 10 \times \log_{10}(T\perp \% / T\| \%)$$

As is evident from Table 1, if the glass composition is the same, the average particle size of deposited silver chloride decreases as the heat treatment temperature is lower. Then, under the condition of the average particle size of 40 nm or less (Embodiments 1 to 6), polarization characteristics in which the average transmittance (T⊥ %$_{500-600nm}$) of light having a polarization plane perpendicular to the longitudinal direction of metallic silver particles is 75% or more in the wavelength range of 500 nm to 600 nm and the minimum extinction ratio in the wavelength range is 25 dB or more were obtained.

In References 1 and 2 in which the average particle size exceeded 40 nm, because both the T⊥ transmission spectra and the extinction ratio were shifted toward the longer wavelength region even under a relatively low stretching tension as shown in Table 1, the average transmittance (T⊥ %$_{500-600nm}$) of 75% or more and the minimum extinction ratio of 25 dB or more could not be obtained at the same time in the wavelength range of 500 nm and 600 nm even if stretching conditions and reduction conditions were changed.

[Reference 3]

Glass in which 0.1% and 0.2% of Cl: 0.37% by weight are replaced by equimolar Br: 0.23% and 0.45% in the glass composition was melted and heat-treated to have the average particle size of silver halide particles of 18 nm like Embodiment 1. The glass perform thus obtained was used to produce polarizing glass by the same method and under the same conditions as those in Embodiment 1 and polarization characteristics were compared. The comparison results show that both spectra of lights of polarization planes perpendicular to the long-axis and short-axis directions of metallic silver particles are shifted as a whole toward the longer wavelength region as an amount of Br increases and the average transmittance and the minimum extinction ratio in 500 nm to 600 nm dropped from 82% and 25 dB in Embodiment 1 in which only Cl is used to 76% and 25 dB and 68% and 8 dB, respectively, in both the average transmittance and the minimum extinction ratio.

Next, a 500-W xenon lamp was shone 40 cm apart on glass polarizers obtained in Embodiments 1 to 6 and References 1 and 2 for 15 minutes to visually observe changes in color due to irradiation and also a change in transmittance at 650 nm before and after irradiation was measured to determine whether or not photochromic characteristics are present. Observation and measurement results showed that no change before and after irradiation was observed in all polarizers obtained in Embodiments 1 to 6 and References 1 and 2, confirming that no photochromic characteristics were exhibited. This means that degradation of polarization characteristics and deterioration of transmittance characteristics of glass polarizers according to the present invention will not be caused by irradiation of ultraviolet or visible short wavelength light.

[Reference 4]

Photochromic characteristics were clearly observed with irradiation from the xenon lamp in a glass polarizer produced under similar conditions from glass of the same composition obtained by melting a batch of material mixed by introducing 0.2% by weight of $Na_2O$ from $Na_2NO_3$ (sodium nitrate), which is a nitrate material, and using no other nitrate material at all. Deterioration of the transmittance at 650 nm can be considered to have been caused by silver chloride particles not reduced inside the glass polarizer being exposed to light.

By controlling the average particle size of silver chloride deposited and dispersed in the base glass to 40 nm or less by heat treatment conditions, as described above, excellent polarization characteristics, that is, the average transmittance (T⊥ %$_{500-600nm}$) of 75% or more and the extinction ratio of 25 dB or more was achieved in the green wavelength range of 500 nm to 600 nm.

Moreover, by containing substantially no copper compound as a glass component and introducing a portion corresponding to 0.5 to 5 wt % in glass oxide composition by nitrate as glass material before melting, a polarizer exhibiting no photochromic characteristics, in which neither polarization characteristics were degraded nor transmittance characteristics were deteriorated by irradiation of ultraviolet or visible short wavelength light, was obtained.

According to the present invention, as described above, an excellent polarizer having the average transmittance ($T\perp \%_{500\text{-}600nm}$) of 75% or more and the extinction ratio of 25 dB or more in the green wavelength range of 500 nm to 600 nm can be provided. In terms of performance, such a polarizer can satisfactorily be used in a liquid crystal display such as a liquid crystal projector. Moreover, considering the fact that a conventional polarizer is used by sticking a resin polarizing film vulnerable to heat and ultraviolet light to sapphire, quarts glass, or a glass substrate, an optical engine itself of a projector can be simplified and, for embodiment, cooling measures including installation of a cooling fan can be mitigated or made unnecessary by replacing base glass by a glass polarizer according to the present invention, which is borosilicate glass excellent in heat resistance and thermal shock resistance. Further, a glass polarizer according to the present invention does not exhibit photochromic characteristics and other performance hardly degrades. Therefore, image quality of a liquid crystal projector is maintained at a high level and, as a result, a longer life of the liquid crystal projector is expected.

The invention claimed is:

1. A glass polarizer for visible light manufactured by heating and stretching borosilicate glass in which silver halide particles are dispersed and deposited by heat treatment and reducing at least a portion of silver halide particles oriented and stretched in the glass to produce metallic silver particles, wherein an average transmittance ($T\perp$ % 500 to 600 nm) in a wavelength range of 500 nm to 600 nm of light having a polarization plane perpendicular to a longitudinal direction of metallic silver particles having shape anisotropy that is uniaxially oriented and dispersed is 75% or more and an extinction ratio in the wavelength range is 25 dB to 40 dB, wherein an average particle size of the silver halide particles dispersed and deposited in the glass by the heat treatment is 40 nm or less.

2. The glass polarizer for visible light according to claim 1, wherein the silver halide particles dispersed and deposited in the glass by the heat treatment are particles of silver chloride.

3. The glass polarizer for visible light according to claim 1, wherein the borosilicate glass is alkali aluminoborosilicate glass, exhibiting no photochromic characteristics, obtained by containing substantially no copper compound as a glass component and introducing a portion corresponding to 0.5 to 5 wt % of glass oxide composition by nitrate as glass material before melting.

4. The glass polarizer for visible light according to claim 2, wherein the borosilicate glass is alkali aluminoborosilicate glass, exhibiting no photochromic characteristics, obtained by containing substantially no copper compound as a glass component and introducing a portion corresponding to 0.5 to 5 wt % of glass oxide composition by nitrate as glass material before melting.

* * * * *